(12) United States Patent
Asai et al.

(10) Patent No.: US 10,616,060 B2
(45) Date of Patent: Apr. 7, 2020

(54) APPARATUS AND METHOD FOR APPLYING SETTINGS, AND COMPUTER-READABLE STORAGE MEDIUM FOR COMPUTER PROGRAM

(71) Applicant: Konica Minolta, Inc., Chiyoda-ku, Tokyo (JP)

(72) Inventors: Shinichi Asai, Gamagori (JP); Takashi Sugaya, Toyokawa (JP); Hideyuki Matsuda, Hirakata (JP); Yu Sonoda, Toyokawa (JP); Shohei Ichiyama, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 195 days.

(21) Appl. No.: 15/215,997

(22) Filed: Jul. 21, 2016

(65) Prior Publication Data
US 2017/0033993 A1    Feb. 2, 2017

(30) Foreign Application Priority Data
Jul. 27, 2015    (JP) .................................. 2015-147789

(51) Int. Cl.
*G06F 15/177* (2006.01)
*H04L 12/24* (2006.01)
(Continued)

(52) U.S. Cl.
CPC .......... *H04L 41/0846* (2013.01); *G06F 3/123* (2013.01); *G06F 3/1204* (2013.01);
(Continued)

(58) Field of Classification Search
CPC . H04L 41/0846; H04L 1/00962; H04L 41/22; G06F 3/1204; G06F 3/123; G06F 3/1291; H04N 1/00962
(Continued)

(56) References Cited

U.S. PATENT DOCUMENTS 6,636,961 B1 *   10/2003   Braun ....................... G06F 8/63
                                                         713/1
8,527,949 B1 *   9/2013    Pleis ................... G06F 15/7867
                                                         717/121
(Continued)

FOREIGN PATENT DOCUMENTS

CN         1494309         5/2004
JP       2014-093640 A     5/2014

OTHER PUBLICATIONS

HP. "HP TippingPoint Security Management System User Guide Version 4.0". Aug. 2013. pp. i-332 (1-348). (Year: 2013).*
(Continued)

*Primary Examiner* — Imad Hussain
(74) *Attorney, Agent, or Firm* — Buchanan Ingersoll & Rooney PC

(57) ABSTRACT

An apparatus for selectively applying settings for each of items set in a first processing device to a second processing device is provided. The settings for each of the items are indicated in each file, and the file is dividable into sets of separate data having a predetermined size or smaller. The apparatus includes a user interface configured to allow a user to choose target separate data from among the sets of separate data of each of the files; a selection portion configured to set, at selected data, the sets of separate data of a file having the target separate data among the files; and an application processing portion configured to perform application processing for applying the settings to the second processing device by using, among the sets of separate data of each of the files, the sets of separate data set at the selected data.

23 Claims, 20 Drawing Sheets

(51) Int. Cl.
    *G06F 3/12*    (2006.01)
    *H04N 1/00*    (2006.01)
(52) U.S. Cl.
    CPC ............ *G06F 3/1291* (2013.01); *H04L 41/22* (2013.01); *H04N 1/00127* (2013.01); *H04N 1/00236* (2013.01); *H04N 1/00962* (2013.01)
(58) Field of Classification Search
    USPC ........................................................ 709/220
    See application file for complete search history.

(56) References Cited

U.S. PATENT DOCUMENTS

| | | | | |
|---|---|---|---|---|
| 2001/0027442 | A1* | 10/2001 | Krahn | G06F 21/6209 705/51 |
| 2005/0033769 | A1* | 2/2005 | Mifune | G06F 40/166 |
| 2005/0114642 | A1* | 5/2005 | Watson-Luke | G06F 9/44505 713/1 |
| 2005/0139650 | A1* | 6/2005 | Gonzalo | G06F 9/4451 235/380 |
| 2008/0022012 | A1* | 1/2008 | Wang | H04L 47/10 709/238 |
| 2008/0304092 | A1* | 12/2008 | Ebuchi | G06F 3/1204 358/1.13 |
| 2009/0158021 | A1* | 6/2009 | Joshi | G06F 9/4401 713/2 |
| 2010/0199035 | A1* | 8/2010 | Matsuo | G06F 3/0625 711/111 |
| 2011/0134452 | A1 | 6/2011 | Kim et al. | |
| 2011/0237944 | A1* | 9/2011 | Shi | A61B 5/00 600/437 |
| 2012/0005309 | A1* | 1/2012 | Obata | G06F 9/45537 709/219 |
| 2012/0089829 | A1* | 4/2012 | Kholidy | H04L 9/065 713/153 |
| 2012/0268783 | A1* | 10/2012 | Nakahara | G06K 15/1805 358/1.15 |
| 2013/0040627 | A1* | 2/2013 | Yu | H04L 41/145 455/418 |
| 2013/0321834 | A1 | 12/2013 | Suzuki | |
| 2014/0298417 | A1* | 10/2014 | Kawashima | G06F 21/6227 726/3 |
| 2015/0062606 | A1* | 3/2015 | Suzuki | G06F 3/1204 358/1.13 |
| 2015/0169267 | A1* | 6/2015 | Hirakawa | G06F 3/1225 358/1.13 |
| 2015/0249769 | A1* | 9/2015 | Asahara | H04N 1/00962 358/1.13 |
| 2015/0288465 | A1* | 10/2015 | Ouyang | H04B 17/18 455/67.11 |
| 2016/0006886 | A1* | 1/2016 | Sato | H04N 1/00965 358/1.15 |

OTHER PUBLICATIONS

Epson. "Custom Use of the Printer Driver". http://support.epson-europe.com/onlineguides/en/spr2880/html/app_2.htm 2008. pp. 1-11. (Year: 2008).*

Oracle. "Configuring Fixed Width Text File Formats." http://www.oracle.com/webfolder/technetwork/data-quality/edqhelp/Content/introduction/getting_started/configuring_fixed_width_text_file_formats.htm 2011. pp. 1-3. (Year: 2011).*

Sanfoundry. "5+ Practical 'csplit' Command Usage Examples in Linux". Archive.org datestamp Jul. 27, 2014. pp. 1-7. (Year: 2014).*

Extended European Search Report dated Dec. 6, 2016, issued by the European Patent Office in corresponding European Application No. EP 16179913.5 (7 pages).

Official Action issued in corresponding Chinese Patent Appiication No. 201510584832.1, dated May 22, 2018, with English Transiation (11 pages).

* cited by examiner

| FILE NAME | SELECTION STATE |
|---|---|
| mfpXXX_adress_data_001.dat | − |
| mfpXXX_adress_data_002.dat | − |
| mfpXXX_adress_data_003.dat | − |
| mfpXXX_device_data_001.dat | − |
| mfpXXX_device_data_002.dat | − |
| mfpXXX_network_setting_data_001.dat | − |
| mfpXXX_network_setting_data_002.dat | − |
| mfpXXX_authuser_data_001.dat | − |
| mfpXXX_authuser_data_002.dat | − |
| mfpXXX_authaccount_data.dat | − |

FIG. 7A

| FILE NAME | SELECTION STATE |
|---|---|
| mfpXXX_adress_data_001.dat | V |
| mfpXXX_adress_data_002.dat | V |
| mfpXXX_adress_data_003.dat | V |
| mfpXXX_device_data_001.dat | -- |
| mfpXXX_device_data_002.dat | -- |
| mfpXXX_network_setting_data_001.dat | -- |
| mfpXXX_network_setting_data_002.dat | -- |
| mfpXXX_authuser_data_001.dat | -- |
| mfpXXX_authuser_data_002.dat | -- |
| mfpXXX_authaccount_data.dat | -- |

| FILE NAME | SELECTION STATE |
|---|---|
| mfpXXX_adress_data_001.dat | V |
| mfpXXX_adress_data_002.dat | V |
| mfpXXX_adress_data_003.dat | V |
| mfpXXX_device_data_001.dat | V |
| mfpXXX_device_data_002.dat | V |
| mfpXXX_network_setting_data_001.dat | V |
| mfpXXX_network_setting_data_002.dat | V |
| mfpXXX_authuser_data_001.dat | V |
| mfpXXX_authuser_data_002.dat | V |
| mfpXXX_authaccount_data.dat | V |

| FILE NAME | SELECTION STATE |
|---|---|
| mfpXXX_adress_data_001.dat | – |
| mfpXXX_adress_data_002.dat | – |
| mfpXXX_adress_data_003.dat | – |
| mfpXXX_device_data_001.dat | V |
| mfpXXX_device_data_002.dat | V |
| mfpXXX_network_setting_data_001.dat | V |
| mfpXXX_network_setting_data_002.dat | V |
| mfpXXX_authuser_data_001.dat | V |
| mfpXXX_authuser_data_002.dat | V |
| mfpXXX_authaccount_data.dat | V |

| | |
|---|---|
| 60a | ☑ mfpXXX_address_data_001.dat |
| 60a | ☑ mfpXXX_address_data_002.dat |
| 60a | ☑ mfpXXX_address_data_003.dat |
| 60a | ☐ mfpXXX_device_setting_001.dat |
| 60a | ☐ mfpXXX_device_setting_002.dat |
| 60a | ☐ mfpXXX_network_setting_001.dat |
| 60a | ☐ mfpXXX_network_setting_002.dat |
| 60a | ☐ mfpXXX_authuser_data_001.dat |
| 60a | ☐ mfpXXX_authuser_data_002.dat |
| 60a | ☐ mfpXXX_authaccount_data.dat |

FIG. 8B

| | |
|---|---|
| 60a — ☑ | mfpXXX_address_data_001.dat |
| 60a — ☑ | mfpXXX_address_data_002.dat |
| 60a — ☑ | mfpXXX_address_data_003.dat |
| 60a — ☑ | mfpXXX_device_setting_001.dat |
| 60a — ☑ | mfpXXX_device_setting_002.dat |
| 60a — ☑ | mfpXXX_network_setting_001.dat |
| 60a — ☑ | mfpXXX_network_setting_002.dat |
| 60a — ☑ | mfpXXX_authuser_data_001.dat |
| 60a — ☑ | mfpXXX_authuser_data_002.dat |
| 60a — ☑ | mfpXXX_authaccount_data.dat |

FIG. 8C

| | |
|---|---|
| 60a | ☐ mfpXXX_address_data_001.dat |
| 60a | ☐ mfpXXX_address_data_002.dat |
| 60a | ☐ mfpXXX_address_data_003.dat |
| 60a | ☑ mfpXXX_device_setting_001.dat |
| 60a | ☑ mfpXXX_device_setting_002.dat |
| 60a | ☑ mfpXXX_network_setting_001.dat |
| 60a | ☑ mfpXXX_network_setting_002.dat |
| 60a | ☑ mfpXXX_authuser_data_001.dat |
| 60a | ☑ mfpXXX_authuser_data_002.dat |
| 60a | ☑ mfpXXX_authaccount_data.dat |

APPARATUS AND METHOD FOR APPLYING SETTINGS, AND COMPUTER-READABLE STORAGE MEDIUM FOR COMPUTER PROGRAM

This application is based on Japanese patent application No. 2015-147789 filed on Jul. 27, 2015, the contents of which are hereby incorporated by reference.

BACKGROUND OF THE INVENTION

1. Field of the Invention

The present invention relates to a technology for applying information on settings for one device to another device.

2. Description of the Related Art

Image forming apparatuses into which functions such as copying, network printing, faxing, scanning, and a file server function are incorporated have attained widespread use. Such an image forming apparatus is generally called a "multifunction device" or a "Multi-Functional Peripheral (MFP)".

The functions of the image forming apparatus have recently increased. For example, the image forming apparatus has a web server and a web browser.

The use of a Web technology makes it easier to export setting-related information from one to the other of two image forming apparatuses as compared to conventional technologies.

The technology below has been proposed as a technology for shifting setting-related information. When setting values are exported from one image processing device, export data is generated using the setting values of the selected setting items acquired from the image processing device, locale information and the setting values of the setting items which depend on locale when the user-selected setting items include setting items which depend on the locale. At the time of importing the setting value to another image processing device, when the locale information is included in the import data and the locale information and the locale information of that another image processing device are different from each other, the locale information of that another image processing device is updated with the locale information included in the import data through authentication of an authorized user who can change the locale information. Then, the setting information of that another image processing device is updated using the setting items depending on the locale which are included in the import data and the setting value of the setting items selected by a user (English abstract of Japanese Laid-open Patent Publication No. 2014-093640).

When exporting setting-related information, an image forming apparatus expands data showing the setting-related information in a memory.

The image forming apparatus, however, uses a built-in hardware resource. The memory, therefore, has only a limited area available for the data. The limited area of the memory to be allocated to the data is, for example, 1 megabyte or so while it depends on the specifications of the image forming apparatus.

Thus, when the size of the data is greater than the size of the allocated area, the image forming apparatus divides the data into a plurality of sets of separate data, each of which has a size of the allocated area or smaller. The image forming apparatus then expands the separate data one by one in the memory to export the separate data.

The image forming apparatus is configured to export, at one time, the data on the setting-related information for each item. The user is allowed to select any of data to be imported and to import the selected data to another image forming apparatus.

However, when the data on the setting-related information is divided into a plurality of sets of separate data and the sets of separate data are exported, it is burdensome for the user to select data to be imported.

SUMMARY

The present invention has been achieved in light of such an issue, and an object thereof is to make it easy, as compared to conventional technologies, for a user to select data to be imported to another device from among a plurality of sets of data exported from a device such as an image forming apparatus using a built-in hardware resource.

An apparatus according to an aspect of the present invention is an apparatus for selectively applying settings for each of items set in a first processing device to a second processing device, the settings for each of the items being indicated in a respective file for each item, the respective files being dividable into sets of separate data having a predetermined size or smaller. The apparatus includes a user interface configured to allow a user to choose target separate data from among the sets of separate data of each of the files; a selection portion configured to set as selected data, the sets of separate data of a file having the target separate data among the files; and an application processing portion configured to perform application processing for applying the settings to the second processing device by using, among the sets of separate data of each of the files, the sets of separate data set at the selected data.

These and other characteristics and objects of the present invention will become more apparent by the following descriptions of preferred embodiments with reference to drawings.

BRIEF DESCRIPTION OF THE DRAWINGS

FIG. 5 is a diagram showing an example of an export file table.

FIGS. 7A-7C are diagrams showing update examples of an export file table.

FIGS. 8A-8C are diagrams showing update examples of check boxes.

DESCRIPTION OF THE PREFERRED EMBODIMENTS

Figure 1:
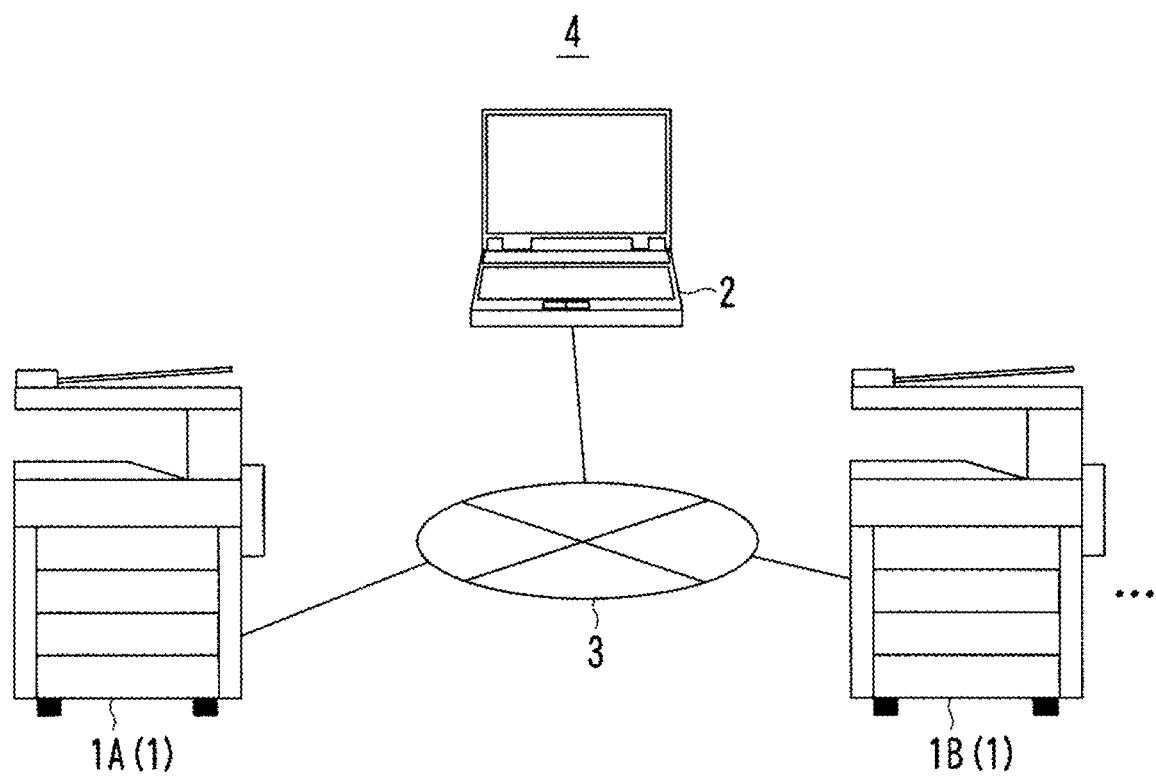
FIG. 1 is a diagram showing an example of the overall configuration of an image processing system.
Figure 2:
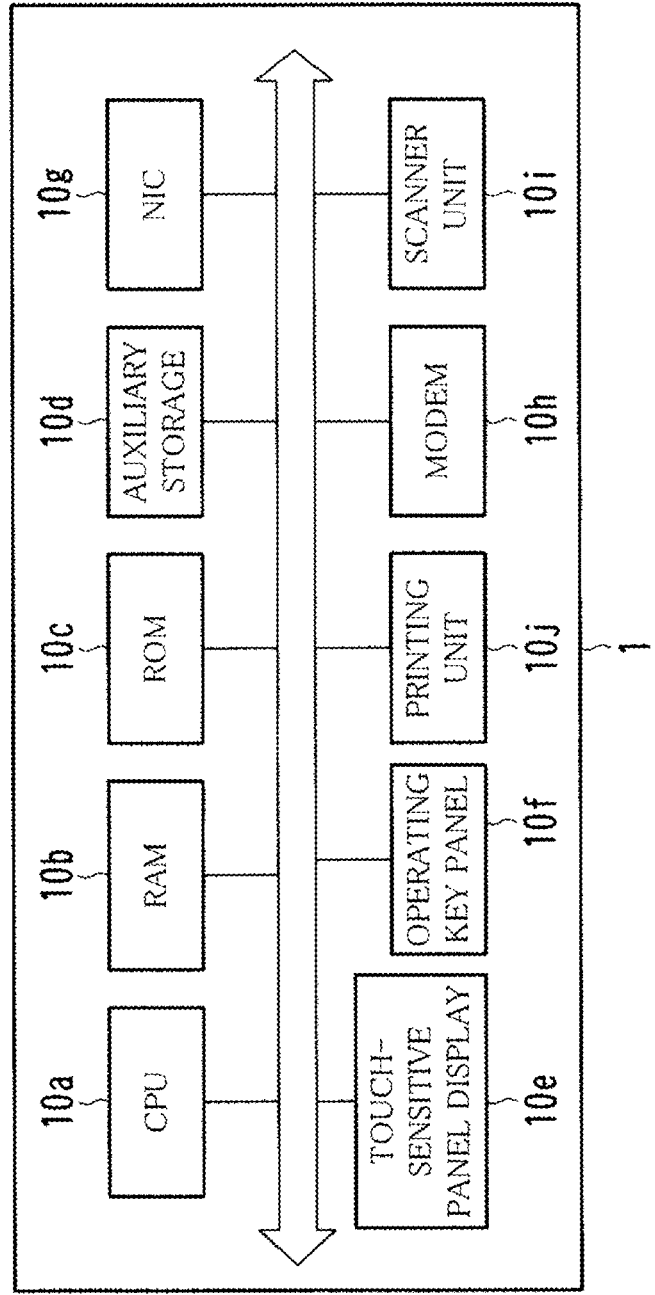
FIG. 2 is a diagram showing an example of the hardware configuration of an image forming apparatus.
Figure 3:
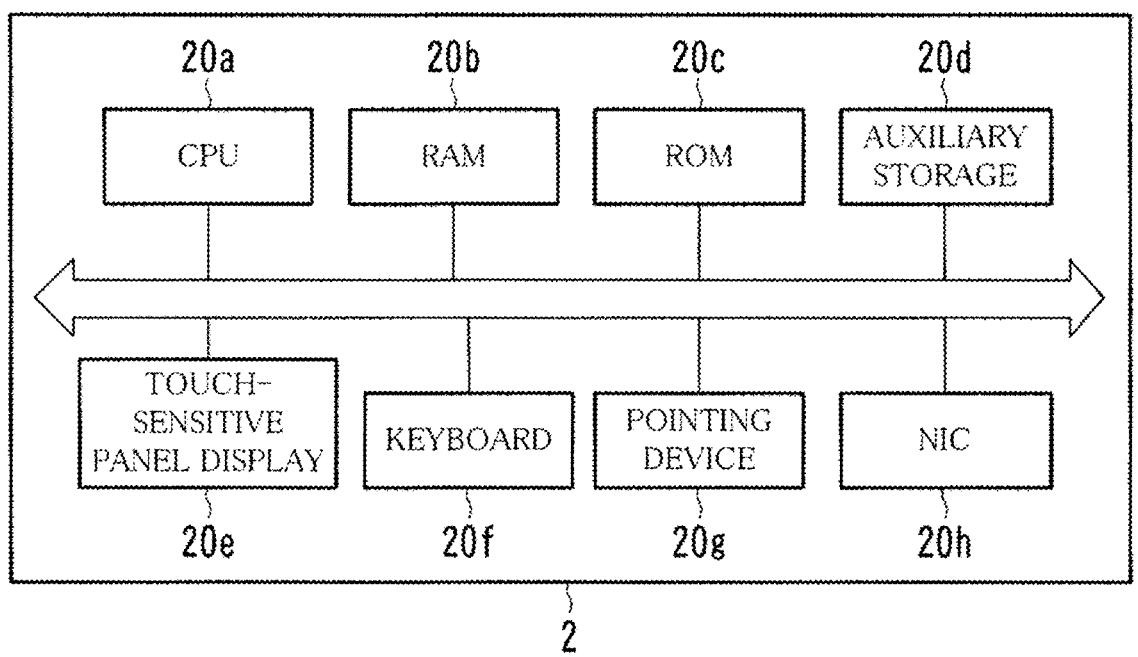
FIG. 3 is a diagram showing an example of the hardware configuration of a terminal.

FIG. 1 is a diagram showing an example of the overall configuration of an image processing system 4. FIG. 2 is a diagram showing an example of the hardware configuration of an image forming apparatus 1. FIG. 3 is a diagram showing an example of the hardware configuration of a terminal 2.

As shown in FIG. 1, the image processing system 4 is configured of a plurality of image forming apparatuses 1, the terminal 2, a communication line 3, and so on.

The image processing system 4 is installed in a company, a government office, or a school, and is shared by users. Hereinafter, the case is described in which the image processing system 4 is used in a company. The company has sections (departments). The company building is a multi-floor building. Each of the sections is located on any of the floors for business.

In order to use the image forming apparatus 1, the users (employees of the company) of the image processing system 4 are required to log in to the image forming apparatus 1. Each user is, therefore, given one user account.

Each section is given one section account. Each of the users uses a section account to log in to the image forming apparatus 1 or to inform the image forming apparatus 1 of his/her section.

The image forming apparatuses 1 and the terminal 2 are configured to perform communication with one another via the communication line 3. Examples of the communication line 3 are a Local Area Network (LAN), the Internet, a public line, and a dedicated line. One network segment is provided for each section. Hereinafter, the network segment is referred to as, simply, a "segment".

The image forming apparatus 1 is an image processing apparatus into which functions such as copying, network printing, faxing, scanning, e-mail function, and box function are consolidated. The image forming apparatus 1 is generally called a "multifunction device" or a "Multi-Functional Peripheral (MFP)".

Hereinafter, the image forming apparatuses 1 may be stated by respectively differentiating them as an "image forming apparatus 1A", an "image forming apparatus 1B", . . . , and so on.

According to the box function, each user is given a storage area called a "box" or a "personal box". The box function enables each user to save data, file by file, to his/her storage area and to manage the data therein. The box corresponds to a "folder" or a "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 10e, an operating key panel 10f, a Network Interface Card (NIC) 10g, a modem 10h, a scanner unit 10i, a printing unit 10j, and so on.

The touch-sensitive panel display 10e displays, for example, a screen for presenting messages to a user, a screen for allowing the user to input commands or information, a screen for showing the results of processing executed by the CPU 10a. The touch-sensitive panel display be sends a signal indicating a touched location to the CPU 10a.

The operating key panel 10f is a so-called hardware keyboard. The operating key panel 10f has numeric keys, a start key, a stop key, and a function key.

The NIC 10g performs communication with the other image forming apparatuses 1 or the terminal 2 in accordance with a protocol such as Transmission Control Protocol/Internet Protocol (TCP/IP).

The modem 10h sends and receives image data with a facsimile terminal in accordance with a protocol such as G3.

The scanner unit 10i optically reads an image recorded on a sheet of paper placed on a platen glass to generate image data thereof.

The printing unit 10j prints, onto paper, an image captured by the scanner unit 10i and an image sent by the terminal 2 and received by the NIC 10g or the modem 10h.

The ROM 10c or the auxiliary storage 10d stores, therein, a program for implementing the functions such as the copy function. The ROM 10c or the auxiliary storage 10d also stores, therein, a web server program and a web browser program.

The programs are loaded into the RAM 10b as necessary, and are executed by the CPU 10a. The auxiliary storage 10d is, for example, a hard disk drive or a Solid State Drive (SSD).

The web server program is executed to export, to another device, information on various items set in the subject image forming apparatus 1. The information to be exported includes user authentication information, section authentication information, destination information, network information, and device information.

The user authentication information is information on user account of each user. The user authentication information is used, when a user performs operation for logging in to the image forming apparatus 1, for example, to authenticate the user. The user authentication information includes a user code and a password. For verifying the user by biometric authentication, information on biological traits such as fingerprints is used instead of the password.

The section authentication information is information on section account of each section. The section authentication information is used to verify a section to which the user belongs. The section authentication information includes a section code and a password.

The destination information is contained in an address book. The destination information includes names, fax numbers, and e-mail addresses of associates with which the company has business or connection on an associate basis.

The network information includes an IP address of the subject image forming apparatus 1, a default gateway of a segment in which the subject image forming apparatus 1 is located, a subnet mask for defining a network part of the IP address, and an IP address of a Domain Name System (DNS) server used by the subject image forming apparatus 1.

The device information is information on the subject image forming apparatus 1, except for the network-related settings therein. The device information includes information on, for example, the default size of font displayed in the touch-sensitive panel display be of the image forming apparatus 1, a screen displayed after the start-up thereof (so-called start screen), default conditions for copying, and information as to whether or not to display a dialog for checking a destination in facsimile transmission.

The web browser displays a web page in the touch-sensitive panel display 10e based on a file described in Hypertext Markup Language (HTML) or JavaScript (registered trademark) provided by the web server.

On the web browser, an import program 10P is executed to import, to the subject image forming apparatus 1, information exported from another image forming apparatus 1.

Referring back to FIG. 1, the terminal 2 is a client of the image forming apparatus 1. The terminal 2 causes the image forming apparatus 1 to print an image prepared in the terminal 2. The terminal 2 also receives an image scanned by the image forming apparatus 1. Examples of the terminal 2 include a personal computer, a tablet computer, and a smartphone. An example is described hereinafter in which the terminal 2 is a personal computer.

Referring to FIG. 3, the terminal 2 is configured of a CPU 20a, a RAM 20b, a ROM 20c, an auxiliary storage 20d, a touch-sensitive panel display 20e, a keyboard 20f, a pointing device 20g, an NIC 20h, and so on.

The touch-sensitive panel display 20e displays, for example, a screen for presenting messages to the user, a screen for allowing the user to input commands or information, a screen for showing the results of processing executed by the CPU 20a.

The keyboard 20f and the pointing device 20g are input devices for the user to enter information and commands. The NIC 20h performs communication with the image forming apparatus 1 in accordance with a protocol such as TCP/IP.

The ROM 20c or the auxiliary storage 20d stores, therein, an operating system, a driver for the image forming apparatus 1, and a web browser program. The programs are loaded into the RAM 20b as necessary and executed by the CPU 20a.

Figure 4:
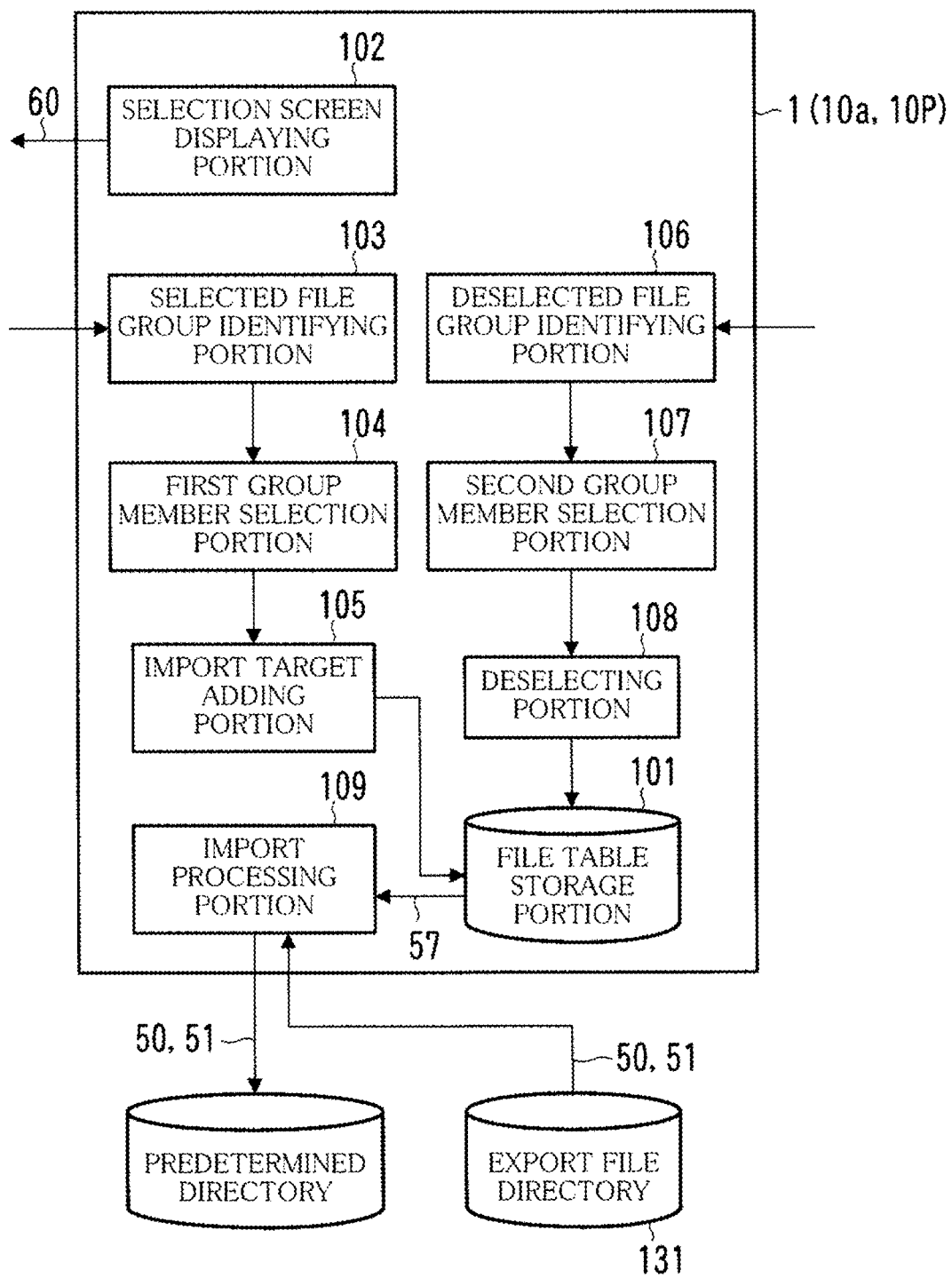
FIG. 4 is a diagram showing an example of the functional configuration of an image forming apparatus.
Figure 6:
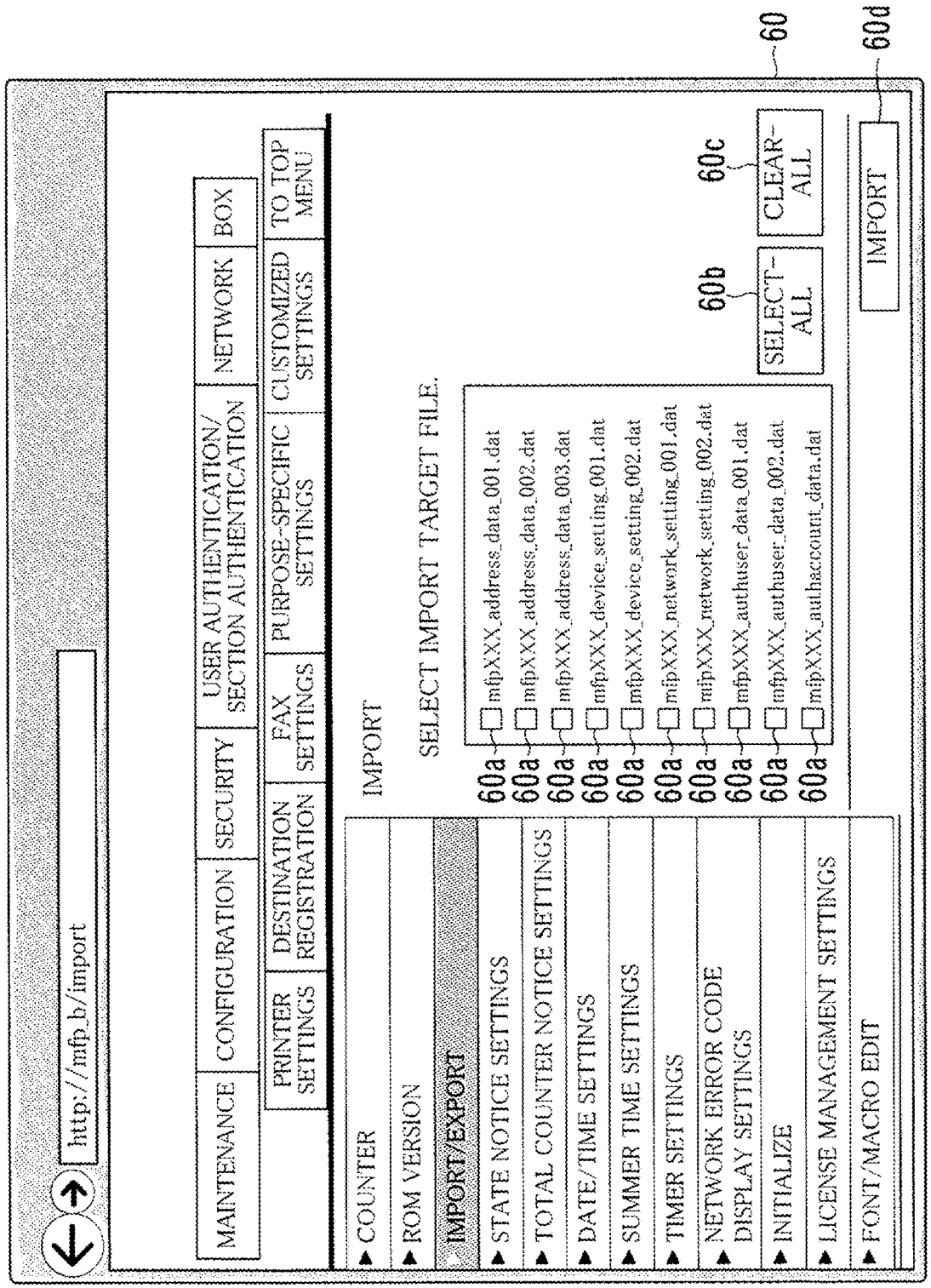
FIG. 6 is a diagram showing an example of a selection screen.

FIG. 4 is a diagram showing an example of the functional configuration of the image forming apparatus 1. FIG. 5 is a diagram showing an example of an export file table 57. FIG. 6 is a diagram showing an example of a selection screen 60. FIGS. 7A-7C are diagrams showing update examples of the export file table 57. FIGS. 8A-8C are diagrams showing update examples of check boxes 60a.

The description goes on to processing for importing a configuration file 50 by taking an example in which the configuration file 50 of the image forming apparatus 1A is applied to the image forming apparatus 1B.

The user enters, in a web browser of the image forming apparatus 1B, a Uniform Resource Locator (URL) of a web page for export from the image forming apparatus 1A.

In response to the entry, the web browser of the image forming apparatus 1B accesses the web page. The web page contains a button for export command. The user presses the button.

In response to the button pressed, the web server of the image forming apparatus 1A exports setting information on each item in the following manner.

The web server reserves a region for export in the RAM 10b. The region for export is of a size S0 (1 megabyte, for example). The web server searches for a configuration file 50 which is stored in a predetermined directory of the image forming apparatus 1A and indicates the setting details of the first item.

In the case where the configuration file 50 has a size larger than the size S0, the web server divides the configuration file 50 into a plurality of separate files 51 each of which has a size equal to or smaller than the size S0.

The web server also adds, to each of the separate files 51, a file name having a common character string, a sequence number, and an extension. The common character string is to identify a group of the separate files 51. In view of this, the character string is referred to as a "group character string".

For example, the separate files 51 obtained by dividing the configuration file 50 for the destination information are given, in order from the top of the separate files 51, file names of "mfpXXX_address_data_001.dat", "mfpXXX_address_data_002.dat", . . . , and so on. Each of the file names has the group character string of "mfpXXX_address_ data", sequence number, and extension.

The web server then writes a common keyword to a predetermined position (header, for example) of each of the separate files 51.

The web server then loads the separate files 51, one by one, to the export region, and sends the same to the image forming apparatus 1B.

On the other hand, in the case where the configuration file 50 has a size equal to or smaller than the size S0, the web server loads the configuration file 50 to the export region without dividing the configuration file 50, and then sends the same to the image forming apparatus 1B. In this case, the configuration file 50 is given a file name having no sequence number.

Likewise, as for the configuration file 50 indicating the setting details of the second item and onward, the web server divides the configuration file 50 into separate files 51 appropriately to send the resultant to the image forming apparatus 1B.

With the image forming apparatus 1B, when receiving a file (configuration file 50 or separate files 51) from the web server, the web browser stores the file into a predetermined directory (hereinafter, referred to as an "export file directory 131"). The web browser then executes the import program 10P.

The import program 10P is provided by a web server of the image forming apparatus 1B. To be specific, the web browser receives the configuration file 50 or the separate files 51 from the image forming apparatus 1A, and after that, redirects a predetermined web page for the web server of the image forming apparatus 1B. Then, as one set of data on the web page, the web server of the image forming apparatus 1B provides the web browser with the import program 10P. Instead of this, the import program 10P may be prepared, as a plug-in, in the web browser.

Other known methods may be used to export data on setting information (configuration file 50 or separate files 51) from the image forming apparatus 1A to the image forming apparatus 1B. At any rate, the configuration file 50 or the separate files 51 are stored into the export file directory 131 of the image forming apparatus 1B.

At a time when the separate files 51 are stored into the export file directory 131, information (settings) indicated therein has not yet been applied to the image forming apparatus 1B. The settings are applied by storing the separate files 51 into a predetermined directory which is different from the export file directory 131.

The import program 10p implements, in the image forming apparatus 1B, the functions of a file table storage portion 101, a selection screen displaying portion 102, a selected file group identifying portion 103, a first group member selection portion 104, an import target adding portion 105, a deselected file group identifying portion 106, a second group member selection portion 107, a deselecting portion 108, an import processing portion 109, and so on, all of which are shown in FIG. 4.

The file table storage portion 101 stores the export file table 57 therein. Referring to FIG. 5, the export file table 57 shows, for each of the files (configuration file 50 or separate files 51) stored in the export file directory 131, a file name and a selection state.

The "selection state" shows whether or not the corresponding file is selected as a target to be imported to the image forming apparatus 1B. In the export file table 57, a value of "V" means that the corresponding file is selected as the import target and a value of "–" (hyphen) means that the corresponding file is not selected as the import target.

Every time a file is stored into the export file directory 131, the file table storage portion 101 adds, to the export file table 57, a selection state and a file name of the file. The initial value of the selection state is the value of "–".

The selection screen displaying portion 102 displays the selection screen 60 as shown in FIG. 6 in the touch-sensitive panel display 10e of the subject image forming apparatus 1B.

The selection screen 60 has file names for each of the configuration file 50 and the separate files 51 stored in the export file directory 131 and the individual check boxes 60a. The check box 60a is an object for the user to select whether or not the corresponding configuration file 50 or separate file 51 is to be included in the import target. The check box turned ON means that the corresponding configuration file 50 or separate file 51 is the import target. The check box turned OFF means that the corresponding configuration file 50 or separate file 51 is not the import target.

When the selection screen 60 is displayed at first, none of the check boxes 60a is turned ON. In short, none of the configuration file 50 and the separate files 51 are included in the import target.

The selection screen 60 also has a select-all button 60b, a clear-all button 60c, an import button 60d, and so on.

The user taps on and select, in the selection screen 60, a check box 60a corresponding to a configuration file 50 or separate file 51 for an item whose setting information is to be imported to the image forming apparatus 1B. The following description takes an example where a check box 60a corresponding to the configuration file 50 is tapped on, and an example where a check box 60a corresponding to the separate file 51 is tapped on. Which of the check boxes 60a has been tapped on may be determined by checking whether or not the file name has a sequence number.

When a check box 60a turned OFF is tapped on, and when a file corresponding to the check box 60a is a separate file 51, the selected file group identifying portion 103 identifies a group to which the separate file 51 belongs.

In this embodiment, the selected file group identifying portion 103 extracts a group character string from the file name of the separate file 51. The selected file group identifying portion 103 then identifies a group corresponding to the group character string as the group to which the separate file 51 belongs. The group character string is obtained by excluding the sequence number and the extension from the file name. For example, when the user selects a separate file 51 having a file name of "mfpXXX_address_data_002.dat", the selected file group identifying portion 103 identifies, as the group to which the separate file 51 belongs, a group corresponding to the group character string of "mfpXXX_address_data_".

The first group member selection portion 104 selects separate files 51 belonging to the group identified by the selected file group identifying portion 103.

In this embodiment, the first group member selection portion 104 selects a separate file 51 having a file name including a group character string of the group identified by the selected file group identifying portion 103. In the foregoing example, the first group member selection portion 104 selects a separate file 51 having a file name including the group character string "mfpXXX_address_data_". To be specific, the first group member selection portion 104 selects separate files 51 having file names of "mfpXXX_address_data_001.dat", "mfpXXX_address_data_002.dat", and "mfpXXX_address_data_003.dat".

The import target adding portion 105 updates a value of a selection state of each of the separate file 51 selected in the export file table 57 by the first group member selection portion 104 with the value of "V". Thereby, the separate files 51 are added to the target to be imported to the image forming apparatus 1B. In the foregoing example, the export file table 57 is updated as shown in FIG. 7A.

The selection screen displaying portion 102 selects check boxes 60a corresponding to the separate files 51 selected by the first group member selection portion 104. In the foregoing example, the selection screen displaying portion 102 selects three check boxes 60a as shown in FIG. 8A.

When a check box 60a turned OFF is tapped on, and when a file corresponding to the check box 60a is a configuration file 50, the import target adding portion 105 updates, in the export file table 57, the value of selection state of the configuration file 50 corresponding to the check box 60a tapped with the value of "V".

The selection screen displaying portion 102 also selects the check box 60a corresponding to the configuration file 50.

In order to import setting information on all items to the image forming apparatus 1B, the user taps on the select-all button 60b.

In response to the select-all button 60b tapped, the import target adding portion 105 updates, in the export file table 57, the values of selection state of all of configuration files 50 and separate files 51 which have not yet been added to the target to be imported to the image forming apparatus 1B with the value of "V". Thereby, the export file table 57 is updated as shown in FIG. 7B.

The user may deselect a separate file 51 which has been added to the target to be imported to the image forming apparatus 1B. The user taps on a check box 60a corresponding to the separate file 51 to be deselected from the import target.

When a check box 60a turned ON is tapped on, the deselected file group identifying portion 106 identifies a group to which the separate file 51 corresponding to the check box 60a tapped belongs.

In this embodiment, the deselected file group identifying portion 106 makes a determination in the same manner as the method for identifying by the selected file group identifying portion 103. To be specific, the deselected file group identifying portion 106 extracts a group character string from the file name of the separate file 51. The deselected file group identifying portion 106 then identifies a group corresponding to the group character string as the group to which the separate file 51 belongs.

The second group member selection portion 107 selects a separate file 51 belonging to the group identified by the deselected file group identifying portion 106.

In this embodiment, the second group member selection portion 107 selects a separate file 51 having, in its file name, the group character string for the group identified by the deselected file group identifying portion 106.

The deselecting portion 108 updates, in the export file table 57, the value of selection state of the separate file 51 selected by the second group member selection portion 107 with the value of "–". Thereby, the separate file 51 is removed from the target to be imported to the image forming apparatus 1B.

The selection screen displaying portion 102 then clears the check box 60a corresponding to the separate file 51 selected by the second group member selection portion 107.

According to the foregoing processing, when the separate file 51 having a file name of, for example, "mfpXXX_address_data_002.dat" is selected, the export file table 57 is updated as shown in FIG. 7C. Further, three check boxes 60a are cleared as shown in FIG. 8C.

The user may remove, from the import target, a configuration file 50 which has been added to the target to be imported to the image forming apparatus 1B. The user taps on a check box 60a corresponding to the configuration file 50 to be removed from the import target.

In response to the check box 60a tapped on, the deselecting portion 108 updates, in the export file table 57, the value of selection state of the configuration file 50 with the value of "–". Thereby, the configuration file 50 is removed from the target to be imported to the image forming apparatus 1B.

The selection screen displaying portion 102 clears the check box 60a corresponding to the configuration file 50.

In order to remove all of the configuration files 50 and the separate files 51 added to the target to be imported to the image forming apparatus 1B, the user taps on the clear-all button 60c.

In response to the clear-all button 60c tapped on, the deselecting portion 108 updates, in the export file table 57, the value of the selection state of each of the configuration files 50 and the separate files 51 added to the target to be imported to the image forming apparatus 1B with the value of "–". Thereby, as shown in FIG. 5, the export file table 57 is returned to the initial state that the selection screen 60 is displayed. The selection screen displaying portion 102 updates the screen so that the select-all button 60b for the configuration files 50 and the separate files 51 is turned OFF.

As discussed above, when the user selects a separate file 51 which is not included in the import target, the selection screen displaying portion 102 selects not only a check box 60a for the separate file 51 but also all check boxes 60a for the other separate files 51 in the same group as the selected separate file 51. Instead of this, another arrangement is also possible. To be specific, the selection screen displaying portion 102 may select, first, a check box 60a for the separate file 51 selected by the user before the selected file group identifying portion 103 starts processing for identifying a group. After the selected file group identifying portion 103 identifies a group and the first group member selection portion 104 identifies separate files 51 belonging to the group, the selection screen displaying portion 102 may select check boxes 60a for, among the identified separate files 51, separate files 51 other than the selected separate file 51, namely, for the remaining separate files 51. The import target adding portion 105 may update, at this time, the selection state of each of the separate files 51.

Likewise, when the user selects a separate file 51 which is included in the import target, the selection screen displaying portion 102 may clear, first, a check box 60a for the separate file 51 selected by the user before the deselected file group identifying portion 106 starts processing for identifying a group. After the deselected file group identifying portion 106 identifies a group and the second group member selection portion 107 identifies separate files 51 belonging to the group, the deselected file group identifying portion 106 may clear check boxes 60a for, among the identified separate files 51, separate files 51 other than the selected separate file 51, namely, for the remaining separate files 51. The import target adding portion 105 may update, at this time, the selection state of each of the separate files 51.

The user operates the check boxes 60a, the select-all button 60b, and the clear-all button 60c appropriately in the manner discussed above to select any of the configuration files 50 or the separate files 51 as the import target. After the selection, the user taps on the import button 60d.

In response to the import button 60d tapped on, the import processing portion 109 executes processing for importing the setting information exported from the image forming apparatus 1A in the following manner.

The import processing portion 109 extracts, from the export file directory 131, separate files 51 having the value of "V" in the selection state of the export file table 57. The import processing portion 109 then selects, from among the separate files 51 extracted, separate files 51 belonging to one group. The import processing portion 109 merges the selected separate files 51 with one another to reconstruct the configuration file 50.

The import processing portion 109 stores the reconstructed configuration file 50 into a predetermined directory.

Alternatively, the import processing portion 109 generates a blank configuration file 50 in the predetermined directory. The import processing portion 109 then writes, into the blank configuration file 50, the content shown in a predetermined part (part except for the header and footer, for example) of each of the selected separate files 51.

For a plurality of groups, the import processing portion 109 performs the processing discussed above for each of the groups.

The import processing portion 109 further extracts, from the export file directory 131, configuration files 50 having the value of "V" in the selection state of the export file table 57. The import processing portion 109 then stores the configuration files 50 extracted into the predetermined directory.

The method for exporting and the method for importing are not limited to the foregoing methods, and may be different methods. For example, in importing destination information, the destination information exported from the export source may be added to destination information exiting in the import destination.

Figure 9:
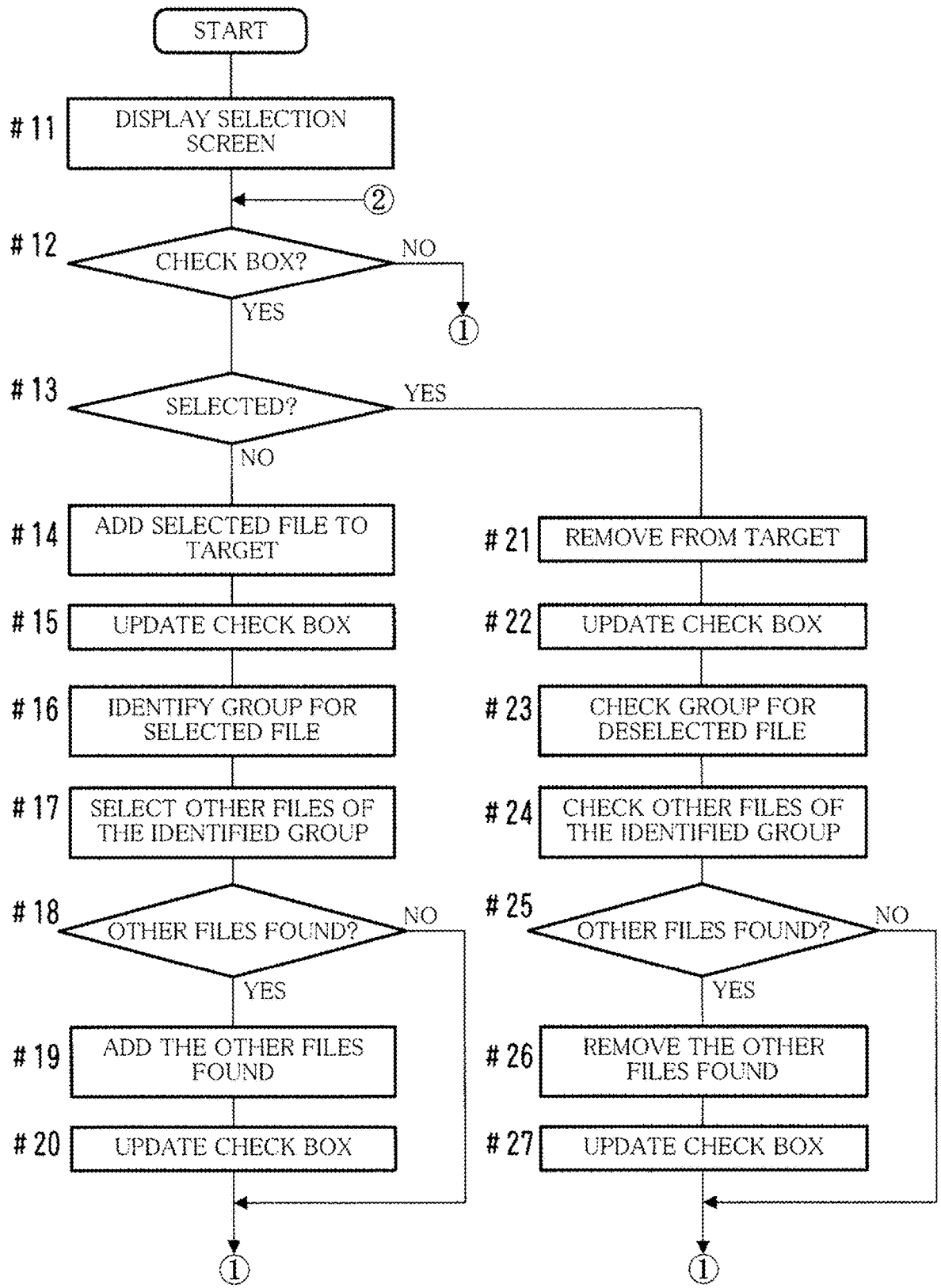
FIG. 9 is a flowchart depicting an example of the flow of the entire processing by an import program.
Figure 10:
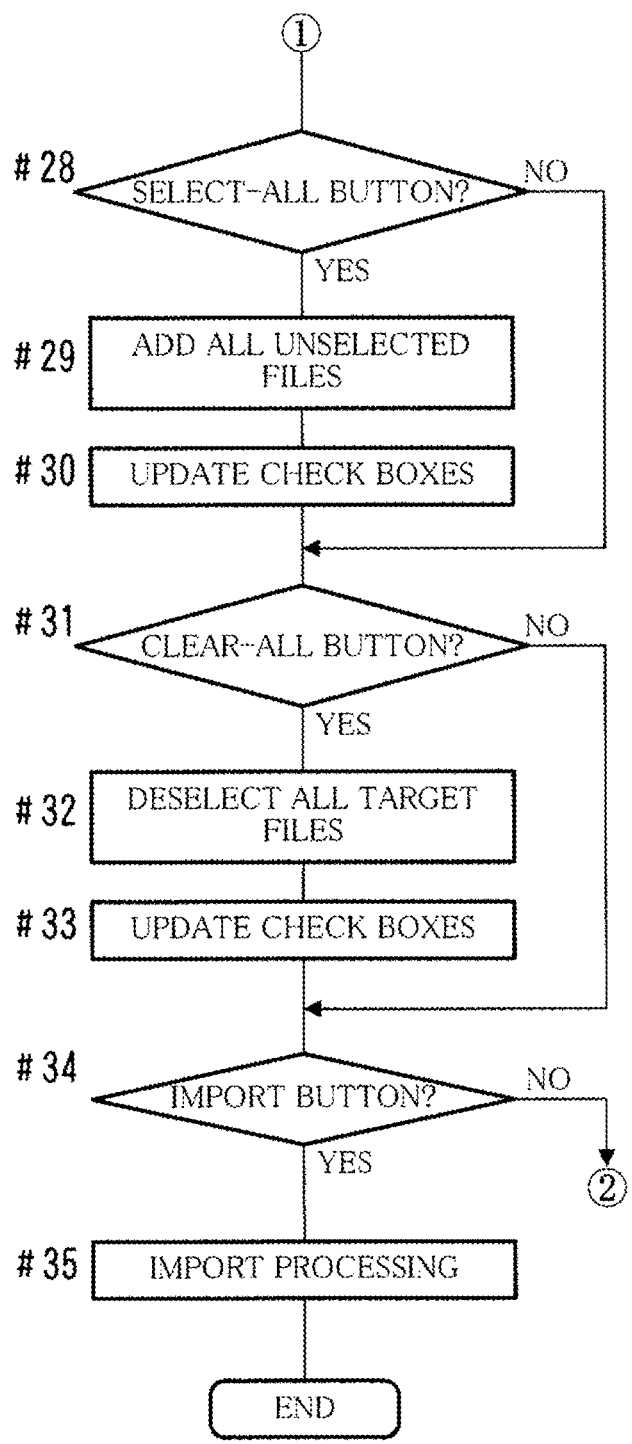
FIG. 10 is a flowchart depicting an example of the flow of the entire processing by an import program.
Figure 11:
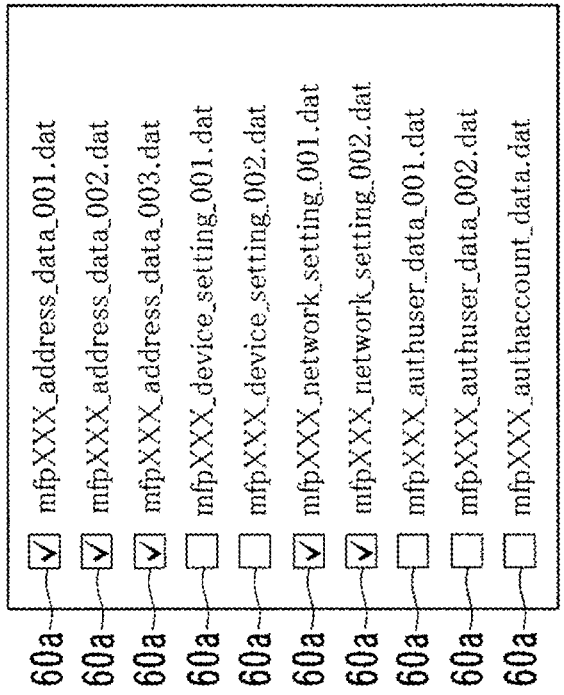
FIG. 11(A)-11(B) are transition diagrams of check boxes.
Figure 11:
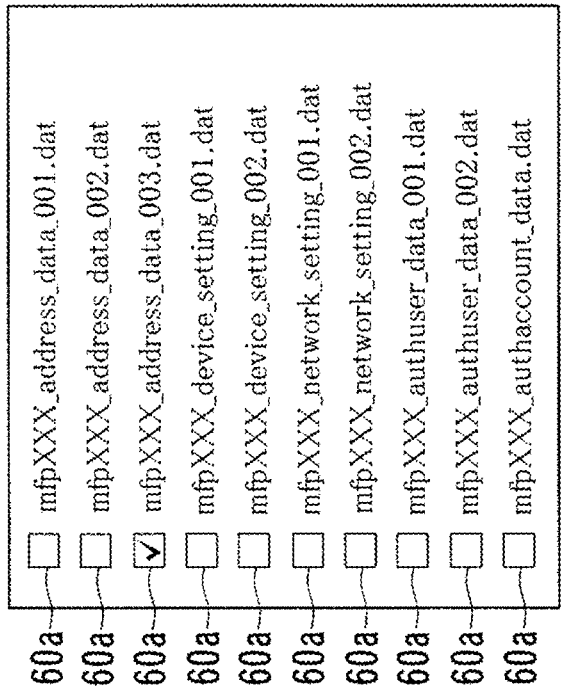
Figure 12:
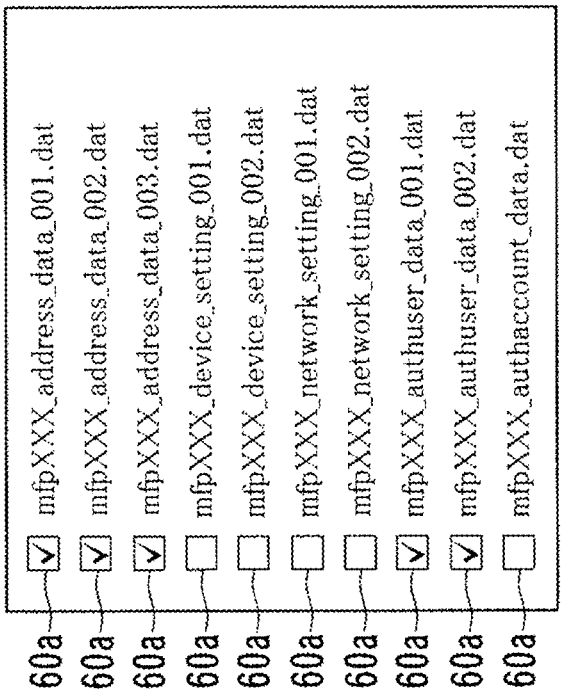
FIG. 12(A)-12(B) are transition diagrams of check boxes.
Figure 12:
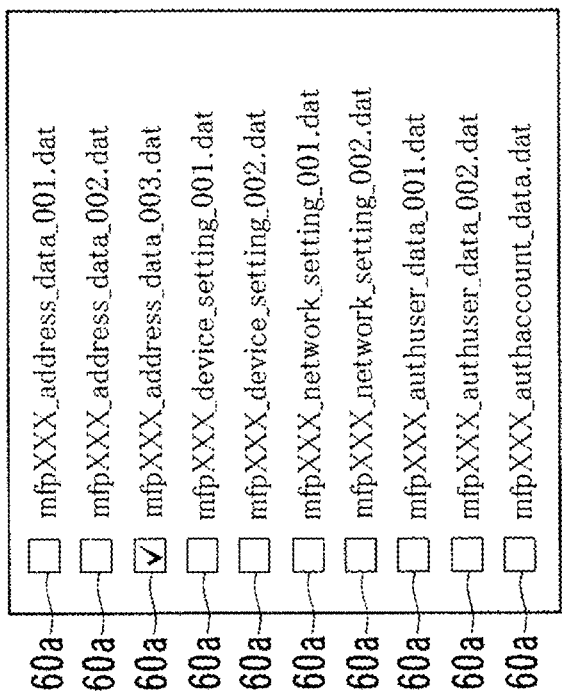
Figure 13:
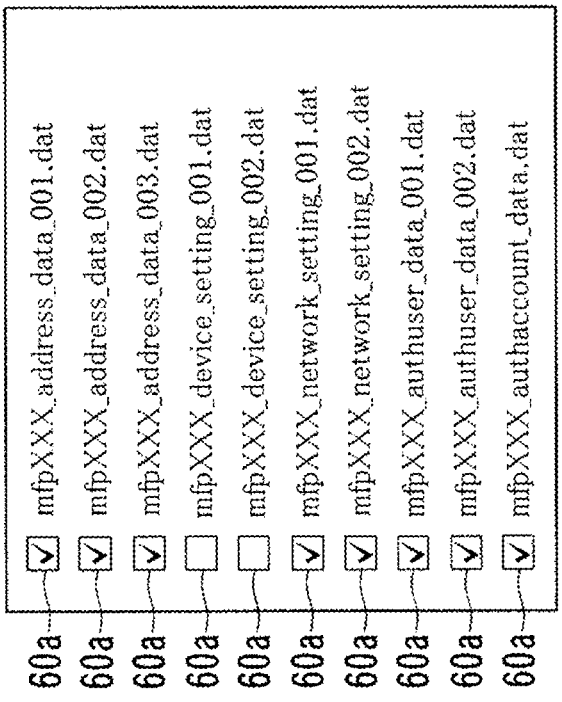
FIG. 13(A)-13(B) are transition diagrams of check boxes.
Figure 13:
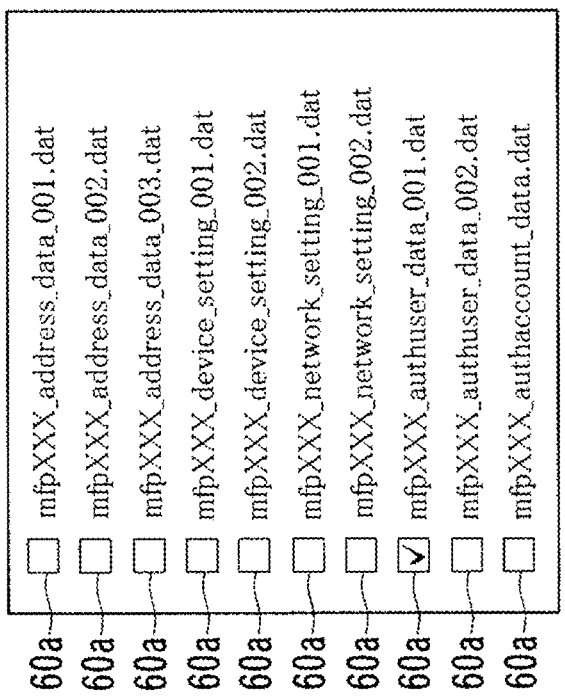
Figure 14:
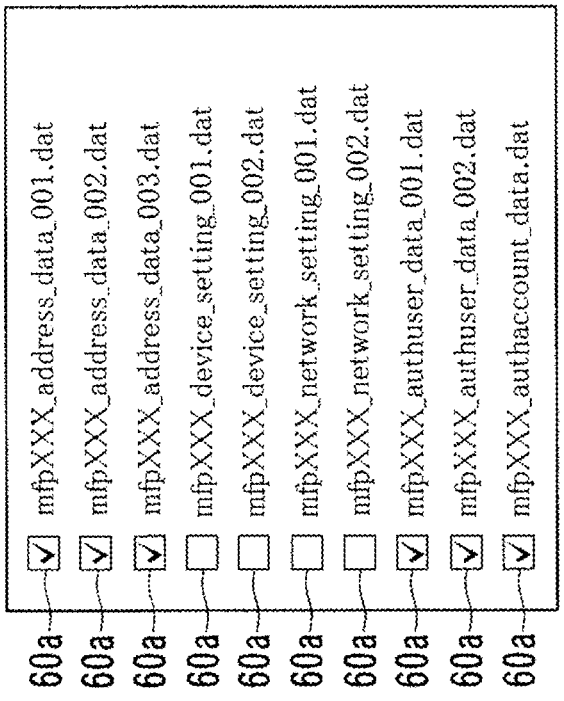
FIG. 14(A)-14(B) are transition diagrams of check boxes.
Figure 14:
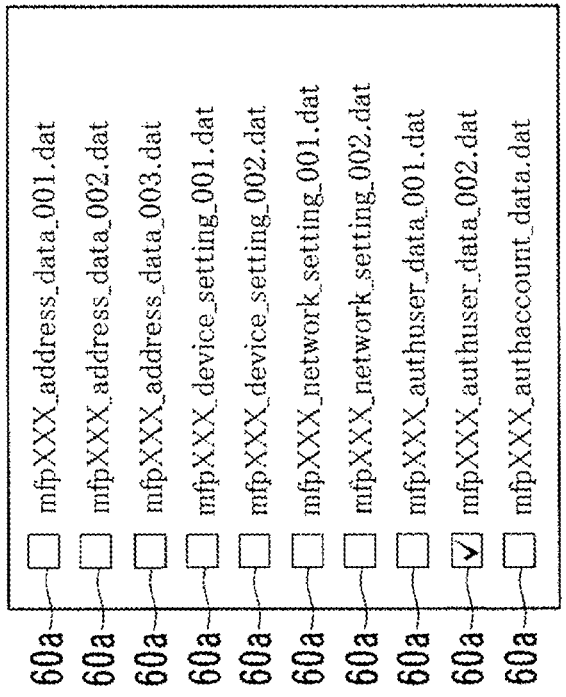

FIGS. 9 and 10 are flowcharts depicting an example of the flow of the entire processing by the import program 10P.

The description goes on to the flow of the entire import processing. The description takes an example where the image forming apparatus 1B imports setting information on each item from the image forming apparatus 1A.

The image forming apparatus 1B performs the processing based on the import program 10p according to the steps shown in FIGS. 9 and 10.

The configuration file 50 or the separate file 51 is exported from the image forming apparatus 1A, and is stored into the export file directory 131 of the image forming apparatus 1B.

In response to the storing, the image forming apparatus 1B displays the selection screen 60 (see FIG. 6) (Step #11 of FIG. 9). The image forming apparatus 1B then performs the processing in accordance with operation by the user in the following manner.

When a check box 60a is tapped on (YES in Step #12), it is supposed that the check box 60a is not selected, i.e., a file (configuration file 50 or separate file 51) corresponding to the check box 60a is not included in the target to be imported (NO in Step #13). In such a case, the image forming apparatus 1B updates (Step #14) the selection state of the file in the export file table 57 (see FIG. 5) with the value "V". The check box 60a is selected (Step #15).

The image forming apparatus 1B then identifies a group for the file (Step #16) and selects the other files (separate files 51) of the group (Step #17). However, if the file is a configuration file 50, then a group for the file is not identified, so that no other files of the group are selected.

If the other files (separate files 51) of the group are identified (YES in Step #18), then the image forming apparatus 1B updates the selection state of each of the other separate files 51 in the export file table 57 with the value "V" (Step #19). The check boxes 60a for the other separate files 51 are selected (Step #20).

On the other hand, if the check box 60a tapped on is already selected, in other words, if a file (configuration file 50 or separate file 51) corresponding to the check box 60a tapped on is already selected as the target to be imported (YES in Step #13), then the image forming apparatus 1B updates the selection state of the file in the export file table 57 with the value of "–" (Step #21). The check box 60a is cleared (Step #22).

The image forming apparatus 1B then identifies a group for the file (Step #23), and selects the other files (separate files 51) of the group (Step #24). However, if the file is a configuration file 50, then the group is not identified so that no other files of the group are selected.

If the other files (separate files 51) of the group are identified (YES in Step #25), then the image forming apparatus 13 updates the selection state for each of the other separate files 51 in the export file table 57 with the value "–" (Step #26). The check boxes 60a for the other separate files 51 are cleared (Step #27).

If the select-all button 60b is tapped on (YES in Step #28 of FIG. 10), then the image forming apparatus 1B updates the selection state of all of the configuration files S0 and the separate files 51 that are not selected as the target to be imported with the value "V" (Step #29). The image forming apparatus 1B then selects check boxes 60a for all of the configuration files 50 and the separate files 51 (Step #30).

If the clear-all button 60c is tapped on (YES in Step #31), then the image forming apparatus 1B updates the selection state of each of the configuration files 50 and the separate files 51 selected as the target to be imported with the value "–" (Step #32). The check boxes 60a corresponding to the configuration files 50 and the separate files 51 are cleared (Step #33).

Before the import button 60d is tapped on, in response to the check box 60a, the select-all button 60b, or the clear-all button 60c tapped on, the image forming apparatus 1B appropriately executes the processing of Step #14 through Step #20, of Step #21 through Step #27, of Step #29 through Step #30, or of Step #32 through Step #33.

If the import button 60d is tapped on (YES in Step #34), then the image forming apparatus 1B performs processing for importing the configuration file 50 and the separate file 51 having the value of "V" in the selection state (Step #35).

According to this embodiment, it is possible for the user to select separate files 51 to be imported to an image forming apparatus 1, which is the import destination, from among the separate files 51 exported from another image forming apparatus 1, which is the export source, more easily than is conventionally possible. In other words, it is possible to make it easy, as compared to conventional technologies, for the user to select data to be imported to another device from among a plurality of sets of data exported from a device such as an image forming apparatus using a built-in hardware resource.

Figure 15:
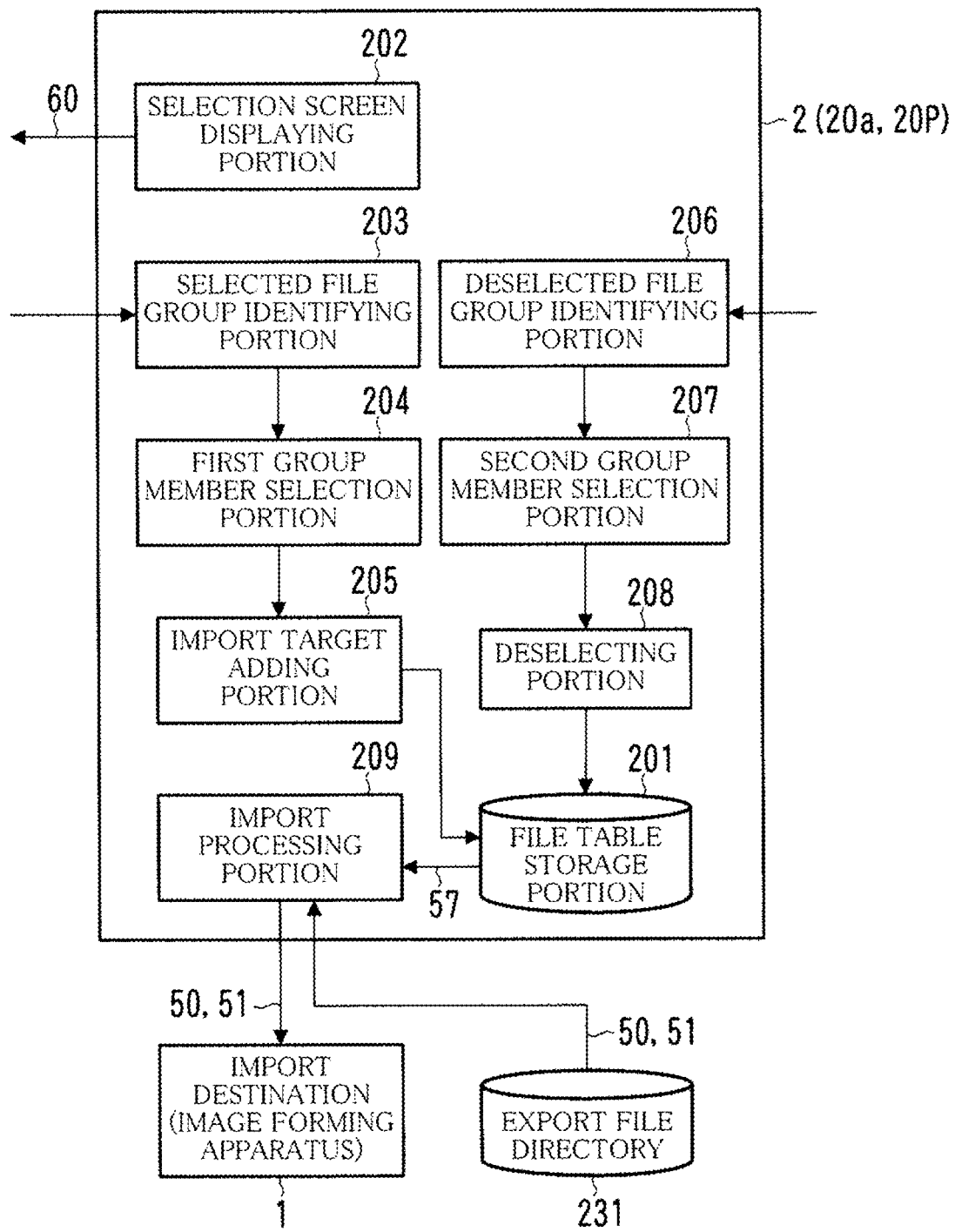
FIG. 15 is a diagram showing an example of the functional configuration of a terminal.
Figure 16:
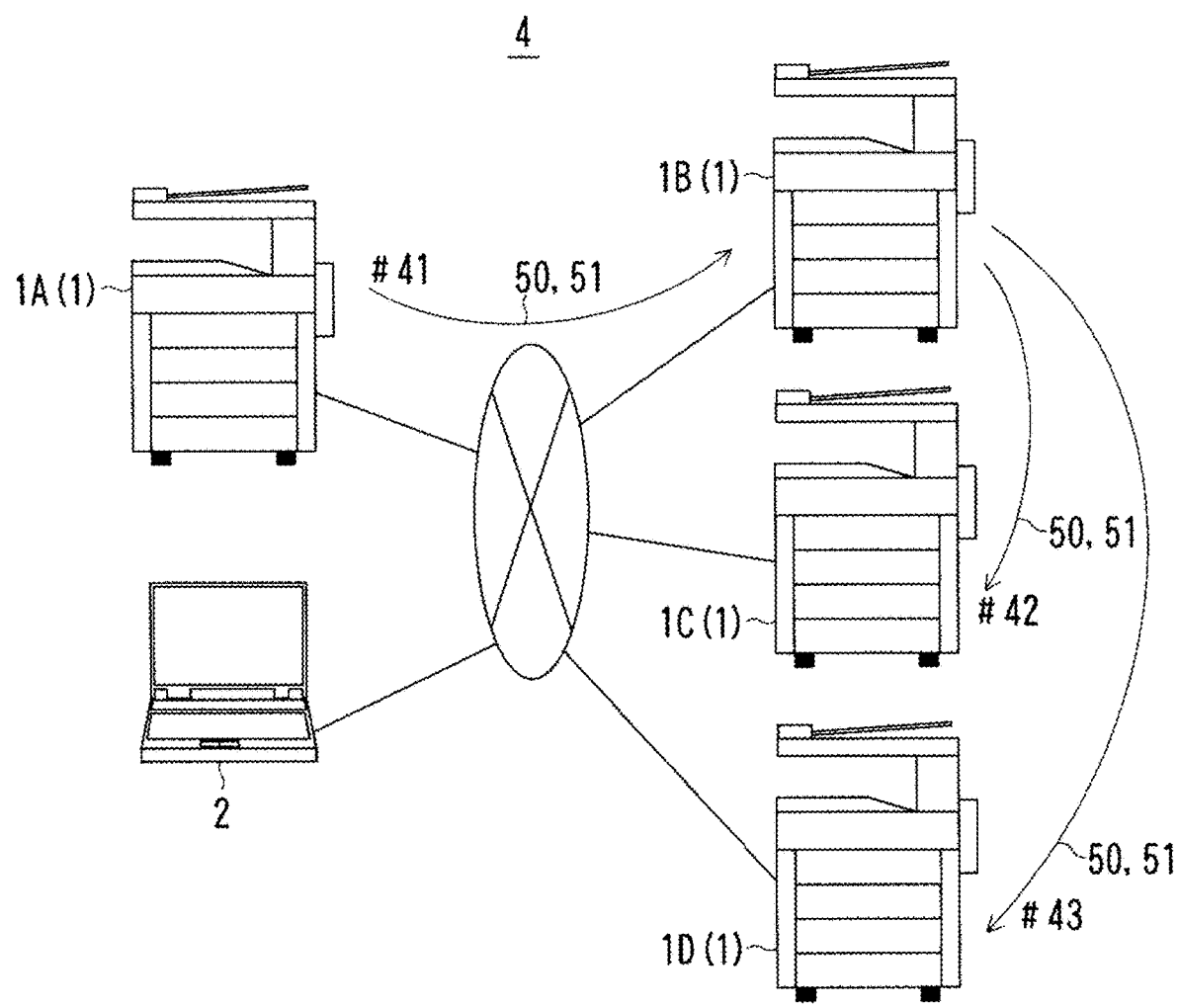
FIG. 16 is a diagram showing a modified example of the overall configuration of an image processing system.

FIG. 11(A)-14(B) are transition diagrams of the check boxes 60a. FIG. 15 is a diagram showing an example of the functional configuration of the terminal 2. FIG. 16 is a diagram showing a modified example of the overall configuration of the image processing system 4.

In this embodiment, the selected file group identifying portion 103 identifies a group of a separate file 51 by using a group character string contained in a file name of the separate file 51. The first group member selection portion 104 then selects separate files 51 having a file name including the group character string of the identified group.

Another arrangement is possible in which the selected file group identifying portion 103 and the first group member selection portion 104 use, instead of the group character string, a keyword indicated in a predetermined position of the separate file 51. Likewise, the deselected file group identifying portion 106 and the second group member selection portion 107 may use a keyword instead of the group character string.

In this embodiment, when a separate file 51 is selected through a check box 60a as a target to be imported, the first group member selection portion 104 selects, as the import target, another separate file 51 of which the original configuration file 50 is the same as the selected separate file 51. Instead of this, it is possible to select a separate file 51 separated from another configuration file 50 related to the configuration file 50, for example, in the following manner.

(1) Group Based on Relationship Between Setting Items

The selected file group identifying portion 103 has a related information table showing identifiers of items related to one another.

The image forming apparatus 1, which is the export source, incorporates in advance an identifier of an item related to the original configuration file 50 into a file name of a separate file 51. Alternatively, the image forming apparatus 1 as the export source writes in advance, as a keyword, the identifier into a predetermined position of the separate file 51.

When an unselected check box 60a corresponding to a separate file 51 is tapped on, the selected file group identifying portion 103 identifies a group of the separate file 51 as a group for the group character string included in the file name of the separate file 51 as describe above.

The selected file group identifying portion 103 extracts an identifier included in a predetermined position of the file name or included in the file name, and identifies, in the related information table, another identifier associated with the extracted identifier.

The selected file group identifying portion 103 identifies a group related to the separate file 51 as a group of separate files 51 having that another identifier at a predetermined position of the file name or in the file name.

The first group member selection portion 104 selects other separate files 51 belonging to any one of the group of the separate file 51 identified by the selected file group identifying portion 103 and the group associated with the separate file 51 identified by the selected file group identifying portion 103.

The import target adding portion 105 updates the selection state of the separate files 51 with the value "V".

As a result, for example, supposing that a check box 60a for a separate file 51 for the destination information is selected when an identifier of the destination information is associated with an identifier of the network information in the related information table, all the separate files 51 for the destination information and all the separate files 51 for the network information are handled as the target to be imported. A this time, in the selection screen 60 (see FIG. 6), check boxes 60a for the selected separate files 51 are turned ON as shown in FIG. 11(A), and check boxes 60a for all of the remaining separate files 51 for the destination information are turned ON and check boxes 60*a* for all of the separate files 51 for the network information are turned ON as shown in FIG. 11(B).

(2) Group Based on Relationship Between Export Source and Import Destination

According to (1) discussed above, the items related to one another are not changed (static). Instead of this, the related items may be determined dynamically based on the relationship between the export source and the import destination (the subject image forming apparatus 1).

In the case where, for example, the export source and the import destination are installed on different floors, the selected file group identifying portion 103 handles two items of user authentication and destination as items related to each other.

Alternatively, in the case where, for example, the export source and the import destination are installed in different segments, the selected file group identifying portion 103 handles four items of user authentication, section authentication, destination, and network as items related to one another.

Yet alternatively, in the case where the export source and the import destination are used in different sections (departments), the selected file group identifying portion 103 handles three items of user authentication, section authentication, and destination as items related to one another.

To be specific, if a check box 60*a* for a separate file 51 related to any one of the items related to one another is tapped on, then the selected file group identifying portion 103 identifies a group of the separate file 51 as a group corresponding to a group character string included in a file name of the separate file 51.

The selected file group identifying portion 103 then extracts an identifier included at a predetermined position in the file name or included in the file name (identifier of item), and identifies another identifier related to the extracted identifier based on relationship between items determined dynamically depending on the foregoing relationship between the export source and the import destination.

The selected file group identifying portion 103 identifies a group related to the separate file 51 as a group of separate files 51 having that another identifier at the predetermined position of the file name or in the file name.

As with the foregoing (1), the first group member selection portion 104 selects other separate files 51 belonging to any one of the group of the separate file 51 identified by the selected file group identifying portion 103 and one or more groups related to the separate file 51 identified by the selected file group identifying portion 103. The import target adding portion 105 updates the selection state of each of the separate files 51 with the value of "V".

As a result of the foregoing processing, all of separate files 51 for the destination information and all of separate files 51 for the user authentication information are handled as the target to be imported, provided that the export source and the import destination are installed on different floors and that a check box 60*a* for one of the separate files 51 for the destination information is tapped on. At this time, the tapped check box 60*a* is selected as shown in the selection screen 60 of FIG. 12(A), and check boxes 60*a* for all of the remaining separate file 51 for the destination information and check boxes 60*a* for all of the remaining separate files 51 for the user authentication information are selected as shown in FIG. 12(B).

Alternatively, in the case where the export source and the import destination are installed in different segments and where a check box 60*a* for one of the separate files 51 for the user authentication information is tapped on, all files for the destination information, all files for the user authentication information, all files for the section authentication information, and all files for the network information are handled as the target to be imported. At this time, the tapped check box 60*a* is selected as shown in FIG. 13(A), and check boxes 60*a* for all of separate files 51 for the destination information, check boxes 60*a* for all the remaining separate files 51 for the user authentication information, a check box 60*a* for the configuration file 50 for the section authentication information, and check boxes 60*a* for all the separate files 51 for the network information are selected as shown in FIG. 13(B). If the configuration file 50 for the section authentication information is divided into separate files 51, then check boxes 60*a* for all the separate files 51 are selected.

Yet alternatively, in the case where the export source and the import destination are used in different sections (departments) and where a check box 60*a* for one of the separate files 51 for the user authentication information is tapped on, all files for the destination information, all files for the user authentication information, and all files for the section authentication information are handled as the target to be imported. At this time, the tapped check box 60*a* is selected as shown in FIG. 14(A), and check boxes 60*a* for all the remaining separate files 51 for the user authentication information, a check box 60*a* for the configuration file 50 for the section authentication information, and check boxes 60*a* for all the separate files 51 for the destination information are selected as shown in FIG. 14(B). If the configuration file 50 for the section authentication information is divided into separate files 51, then check boxes 60*a* for all the separate files 51 are selected.

The segment of the export source and the segment of the import destination are preferably identified based on the IP address and the subnet mask by using a conventional method.

As for the floor where the export source is installed and the floor where the import destination is installed, the individual image forming apparatuses 1 have in advance a table showing the correspondence between the floor and each of the image forming apparatuses 1. The same is also applied to the case of a section. The floor may be identified based on GPS information. The section may be identified based on a section account which is used most frequently in each of the export source and the import destination. Alternatively, the section may be identified based on a section account currently used.

When the user selects a separate file 51 to be removed from the import target, the deselected file group identifying portion 106 may identify a group in the same manner as any one of the modified examples discussed in the foregoing (1) and (2) both of which are performed by the selected file group identifying portion 103.

Which of (1) and (2) is to be applied may be preset arbitrarily. According to what is discussed in (2), the relationship between the export source and the import destination sometimes corresponds to some of the three relationships of: differing in segment; differing in floor; and differing in section. In view of this, it is possible to prioritize the three relationships in advance. When the relationship between the export source and the import destination corresponds to some of the three relationships, the selected file group identifying portion 103 and the deselected file group identifying portion 106 preferably perform the processing in accordance with the relationship given the highest priority.

In this embodiment, the check boxes 60a are used as objects to select a configuration file 50 and a separate file 51 as the target to be imported, or to deselect the same from the target. Instead of the check boxes 60a, other objects may be used. Such an object may be a pull-down menu. Alternatively, such objects may be two radio buttons which correspond to "select" and "deselect" respectively.

In this embodiment, the image forming apparatus 1B executes the import program 10P to import setting information exported from the image forming apparatus 1A. Instead of this, however, the setting information may be imported in response to an import program 20P executed by the terminal 2.

The import program 20P is provided to the web browser from the image forming apparatus 1 which is the import destination when the user designates a predetermined URL on the web browser of the terminal 2.

The import program 20P is executed by the CPU 20a, so that the import program 20P implements, in the terminal 2, the functions of a file table storage portion 201, a selection screen displaying portion 202, a selected file group identifying portion 203, a first group member selection portion 204, an import target adding portion 205, a deselected file group identifying portion 206, a second group member selection portion 207, a deselecting portion 208, an import processing portion 209, and so on, all of which are shown in FIG. 15.

The functions of the file table storage portion 201 through the import processing portion 209 are basically the same as those of the file table storage portion 101 through the import processing portion 109 (see FIG. 4) of the image forming apparatus 1, respectively. The description goes on to an example where the export source is the image forming apparatus 1A and the import destination is the image forming apparatus 1B, focusing on the differences from the functions of the file table storage portion 101 through the import processing portion 109 discussed above.

The configuration file 50 and the separate files 51 exported from the image forming apparatus 1A are stored into a predetermined directory of the terminal 2. The predetermined directory is hereinafter referred to as an "export file directory 231".

The selection screen displaying portion 202 displays the selection screen 60 as with the case of the selection screen displaying portion 102. However, where the selection screen 60 is displayed is in the touch-sensitive panel display 20e. The user operates the touch-sensitive panel display 20e, the keyboard 20f, or the pointing device 20g to select the configuration file 50 or the separate files 51 arbitrarily.

The selected file group identifying portion 203, the first group member selection portion 204, and the import target adding portion 205 perform processing in the same manner as the selected file group identifying portion 103, the first group member selection portion 104, and the import target adding portion 105, respectively.

The deselected file group identifying portion 206, the second group member selection portion 207, and the deselecting portion 208 perform processing in the same manner as the deselected file group identifying portion 106, the second group member selection portion 107, and the deselecting portion 108, respectively.

As with the import processing portion 109, the import processing portion 209 uploads, from the export file directory 231, the configuration file 50 and the separate files 51 selected as the target to be imported into a predetermined directory of the import destination (image forming apparatus 1B in this example). The processing for merging the separate files 51 of one group to reproduce the configuration file 50 may be performed by the import processing portion 209 or by the image forming apparatus 1B.

In this embodiment, exported information is imported to only one image forming apparatus 1. When the image forming apparatuses 1 are managed collectively (so called group-managed), the exported information may be imported to the image forming apparatuses 1. Hereinafter, the case is described in which the image forming apparatuses 1B, 1C, and 1D of the image forming apparatuses 1A through 1D are managed as one group.

The image forming apparatuses 1B, 1C, and 1D have in advance a list of the image forming apparatuses 1 managed collectively. Each of the image forming apparatuses 1C and 1D has the same functions of those of the image forming apparatus 1B.

The configuration file 50 or the separate files 51 are exported from the image forming apparatus 1A and are imported to the image forming apparatus 1B (Step #41 of FIG. 16). The import processing is the same as that discussed above. To be specific, the image forming apparatus 1B imports the configuration file 50 or the separate files 51 based on the import program 10P. Alternatively, the import program 20P may be used to import the configuration file 50 or the separate files 51 through the terminal 2.

The image forming apparatus 1B sends, to the image forming apparatuses 1C and 1D, the configuration file 50 or the separate files 51 imported to the image forming apparatus 1B only, among the configuration file 50 and the separate files 51 exported from the image forming apparatus 1A (Steps #42 and #43).

In response to the configuration file 50 or the separate file 51 received from the image forming apparatus 1B, each of the image forming apparatuses 1C and 1D imports the same thereto.

It is to be understood that the configurations of the image processing system 4, the image forming apparatuses 1, the terminal 2, the constituent elements thereof, the content of the processing, the items of settings, the order of the processing, the structure of the data, the configuration of the screens, and the like may be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for selectively applying settings for each of a plurality of items set in a first processing device to a second processing device, the settings for each of the plurality of items being included in a respective setting file for each item, the respective setting files being dividable into separate data files having a predetermined size or smaller, wherein each of the separate data files created from a single setting file includes a common keyword at a predetermined position within the separate data file, the apparatus comprising:

a user interface configured to allow a user to select as target separate data some of the separate data files from among the separate data files;

a hardware processor configured to:

for each of the separate data files selected by the user as target data, automatically set as selected data, all of the separate data files having a keyword at the predetermined position that is in common with the keyword in the selected separate data file; and perform application processing to apply the settings in the selected data to the second processing device.

2. The apparatus according to claim 1, wherein the user interface allows the user to choose, as the target data, any of the separate data files by displaying objects, next to one another, corresponding to the separate data files on each of the files.

3. The apparatus according to claim 2, wherein the hardware processor further sets, at the selected data, the separate data files on each of the items related to an item for the separate data files corresponding to the object on which choosing operation is made among the separate data files on each of the files.

4. The apparatus according to claim 2, the hardware processor further configured to, when deselection operation is made on the object, remove, from the selected data files, separate data files corresponding to the object and separate data files having an original file which is identical to that of the separate data files corresponding to the object among the sets of separate data files on each of the setting files; wherein the hardware processor performs the application processing after operation for executing the application processing is made.

5. The apparatus according to claim 4, wherein the hardware processor further removes, from the selected data files, all separate data files on an item related to an item for the separate data files corresponding to the object on which the deselection operation is made among the separate data files on each of the files.

6. The apparatus according to claim 3, wherein any two or more of the items are set as items mutually related in a fixed manner.

7. The apparatus according to claim 3, wherein two or more items mutually related of the items are set depending on configuration of the first processing device and configuration of the second processing device.

8. The apparatus according to claim 7, wherein the items include a first item related to user authentication, a second item related to section authentication, a third item related to network, a fourth item related to data destination, and a fifth item related to device, and when the first processing device and the second processing device are installed in different segments, the first item, the second item, the third item, and the fourth item are set as the two or more items mutually related.

9. The apparatus according to claim 7, wherein the items include a first item related to user authentication, a second item related to section authentication, a third item related to network, a fourth item related to data destination, and a fifth item related to device, and when the first processing device and the second processing device are installed on different floors, the first item and the fourth item are set as the two or more items mutually related.

10. The apparatus according to claim 7, wherein the items include a first item related to user authentication, a second item related to section authentication, a third item related to network, a fourth item related to data destination, and a fifth item related to data, and when the first processing device and the second processing device are used in different sections, the first item, the second item, and the fourth item are set as the two or more items mutually related.

11. The apparatus according to claim 2, comprising a communication device configured to perform communication with the first processing device and the second processing device via a communication line, and a storage medium for storing, therein, the separate data files on each of the items exported from the first processing device; wherein the hardware processor performs the application processing by using the separate data files on each of the items stored in the storage medium.

12. The apparatus according to claim 2, wherein the user interface and the hardware processor are provided in the second processing device.

13. The apparatus according to claim 12, comprising a transmission portion configured to send, to one or more third processing devices managed collectively with the second processing device, separate data set as the selected data among the separate data files on each of the items.

14. A method for selectively applying settings for each of a plurality of items set in a first processing device to a second processing device, the settings for each of the plurality of items being included in a respective setting file for each item, the respective setting files being dividable into separate data files having a predetermined size or smaller, the method comprising:

prompting a user to choose target data some of the separate data files from among the separate data files;

for each of the separate data files selected by the user as target data, automatically setting as selected data, all of the separate data files having a keyword at the predetermined position that is in common with the keyword in the selected separate data file; and performing application processing to apply the settings in the selected data to the second processing device.

15. A non-transitory computer-readable storage medium storing thereon a computer program used in a computer for selectively applying settings for each of a plurality of items set in a first processing device to a second processing device, the settings for each of plurality of the items being included in a respective setting file for each item, the respective setting files being dividable into separate data files having a predetermined size or smaller, the computer program causing the computer to execute processing comprising:

processing for prompting a user to choose target data some of the separate data files from among the separate data files;

for each of the separate data files selected by the user as target data, processing for automatically setting as selected data, all of the separate data files having a keyword at the predetermined position that is in common with the keyword in the selected separate data file; and application processing to apply the settings in the selected data to the second processing device.

16. The non-transitory computer-readable storage medium according to claim 15, wherein the computer program causes the computer to execute processing for displaying objects, next to one another, corresponding to the separate data files on each of the files in order to allow the user to choose the target data.

17. The non-transitory computer-readable storage medium according to claim 16, wherein the computer program causes the computer to further set, as the selected data, the separate data files on each of the items related to an item for the separate data files corresponding to the object on which choosing operation is made among the separate data files on each of the files.

18. The non-transitory computer-readable storage medium according to claim 16, wherein the computer program causes the computer to execute deselection processing for, when deselection operation is made on any of the objects, removing, from the selected data, separate data files corresponding to the object and separate data files having an original file which is identical to that of the separate data files corresponding to the object among the separate data files on each of the files, and the computer program causes the computer to execute the application processing after operation for executing the application processing is made.

19. The non-transitory computer-readable storage medium according to claim 18, wherein the computer program causes the computer to further remove, from the selected data, all separate data files on an item related to an item for the separate data files corresponding to the object on which the deselection operation is made among the separate data files on each of the files.

20. The non-transitory computer-readable storage medium according to claim 17, wherein any two or more of the items are set as items mutually related in a fixed manner.

21. The non-transitory computer-readable storage medium according to claim 17, wherein two or more items mutually related of the items are set depending on configuration of the first processing device and configuration of the second processing device.

22. The non-transitory computer-readable storage medium according to claim 16, wherein the computer program causes the second processing device, instead of the computer, to perform the processing for displaying, the processing for setting, and the application processing.

23. The non-transitory computer-readable storage medium according to claim 22, wherein the computer program causes the second processing device to execute processing for sending, to one or more third processing devices managed collectively with the second processing device, separate data set as the selected data among the sets of separate data on each of the items.

\* \* \* \* \*